(12) United States Patent
Chung et al.

(10) Patent No.: US 10,712,808 B2
(45) Date of Patent: Jul. 14, 2020

(54) ELECTRONIC DEVICE AND METHOD FOR SWITCHING DISPLAY MODE THEREOF

(71) Applicant: Chiun Mai Communication Systems, Inc., New Taipei (TW)

(72) Inventors: Yi-Cheng Chung, New Taipei (TW); Hao-Cheng Chen, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 143 days.

(21) Appl. No.: 16/101,686

(22) Filed: Aug. 13, 2018

(65) Prior Publication Data

US 2019/0056775 A1 Feb. 21, 2019

(30) Foreign Application Priority Data

Aug. 15, 2017 (CN) .......................... 2017 1 0698878

(51) Int. Cl.

| G06F 1/26   | (2006.01) |
|-------------|-----------|
| G06F 1/32   | (2019.01) |
| G06F 1/3287 | (2019.01) |
| G06F 1/3206 | (2019.01) |
| G06F 3/048  | (2013.01) |
| G06F 1/3231 | (2019.01) |
| G06F 1/3234 | (2019.01) |
| H04W 52/02  | (2009.01) |

(52) U.S. Cl.
CPC .......... *G06F 1/3287* (2013.01); *G06F 1/3206* (2013.01); *G06F 1/3231* (2013.01); *G06F 1/3265* (2013.01); *G06F 3/048* (2013.01); *H04W 52/027* (2013.01); *G09G 2330/023* (2013.01); *H04W 52/0254* (2013.01)

(58) Field of Classification Search
None
See application file for complete search history.

(56) References Cited

U.S. PATENT DOCUMENTS

| 6,121,962 A * | 9/2000 | Hwang ................. G06F 1/3203 345/211 |
| 7,196,700 B1 * | 3/2007 | Aho ....................... G09G 3/20 345/211 |
| 2014/0118272 A1 | 5/2014 | Gunn |
| 2014/0335827 A1 | 11/2014 | Tsuda |

FOREIGN PATENT DOCUMENTS

| CN | 103514837 A | 1/2014 |
| CN | 103810971 A | 5/2014 |
| TW | 201116988   | 5/2011 |

* cited by examiner

*Primary Examiner* — Nitin C Patel
(74) *Attorney, Agent, or Firm* — ScienBiziP, P.C.

(57) ABSTRACT

An electronic device includes a display and a processor. The processor controls the display to operate in a full display mode to display a full color user interface, detects whether a first predetermined trigger event occurs, controls the display, when the first predetermined trigger event occurs, to switch from the full display mode to a partial display mode, generates a partial interface and displays the partial interface on the display, and switches from an operating mode to a sleep mode after the partial interface is displayed on the display.

20 Claims, 5 Drawing Sheets

May 17 Wednesday

ELECTRONIC DEVICE AND METHOD FOR SWITCHING DISPLAY MODE THEREOF

CROSS-REFERENCE TO RELATED APPLICATIONS

This application claims priority to Chinese Patent Application No. 201710698878.0 filed on Aug. 15, 2017, the contents of which are incorporated by reference herein.

FIELD

The subject matter herein generally relates to a method for switching a display mode of an electronic device.

BACKGROUND

Generally, electronic devices such as mobile phones are configured to display the time, date, and other information. In order to check the time, date or other information, a display screen of the electronic device must be fully switched on from a sleep mode to an operating mode, and thus consume power of the electronic device.

BRIEF DESCRIPTION OF THE DRAWINGS

Implementations of the present disclosure will now be described, by way of example only, with reference to the attached figures.

DETAILED DESCRIPTION

Figure 1:
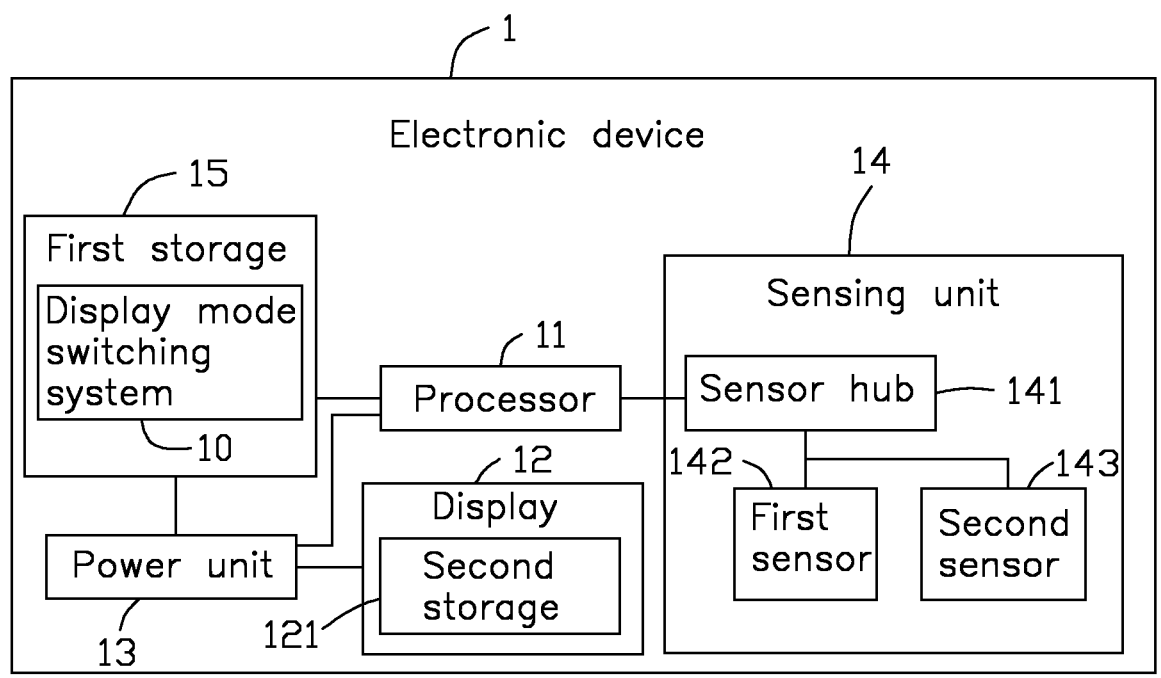
FIG. 1 is a block diagram of an exemplary embodiment of an electronic device in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an embodiment of an electronic device 1 having a display switching system 10 implemented therein. The electronic device 10 may be a mobile phone, a personal digital assistant, a portable gaming console, a digital camera, a tablet computer, or the like.

The electronic device includes a processor 11, a display 12, a power unit 13, a sensing unit 14, and a first storage 15. The processor 11 is operable in an operating mode and a sleep mode. The display 12 is operable in a full display mode, a partial display mode (shown in FIG. 2), and an off mode. In the full display mode, the display 12 displays a full color user interface. In the partial display mode, the display 12 displays a partial interface (shown in FIG. 2). The partial interface is displayed in a designated portion of the display 12 and may include at least the time in a single color. The outside of the partial interface may be displayed in black (shown in FIG. 2). Therefore, power may be saved in the partial display mode. In the off mode, the display 12 is switched off and does not display anything, thereby saving more power. The display 12 in the partial display mode consumes less power than in the full display mode.

Figure 2:
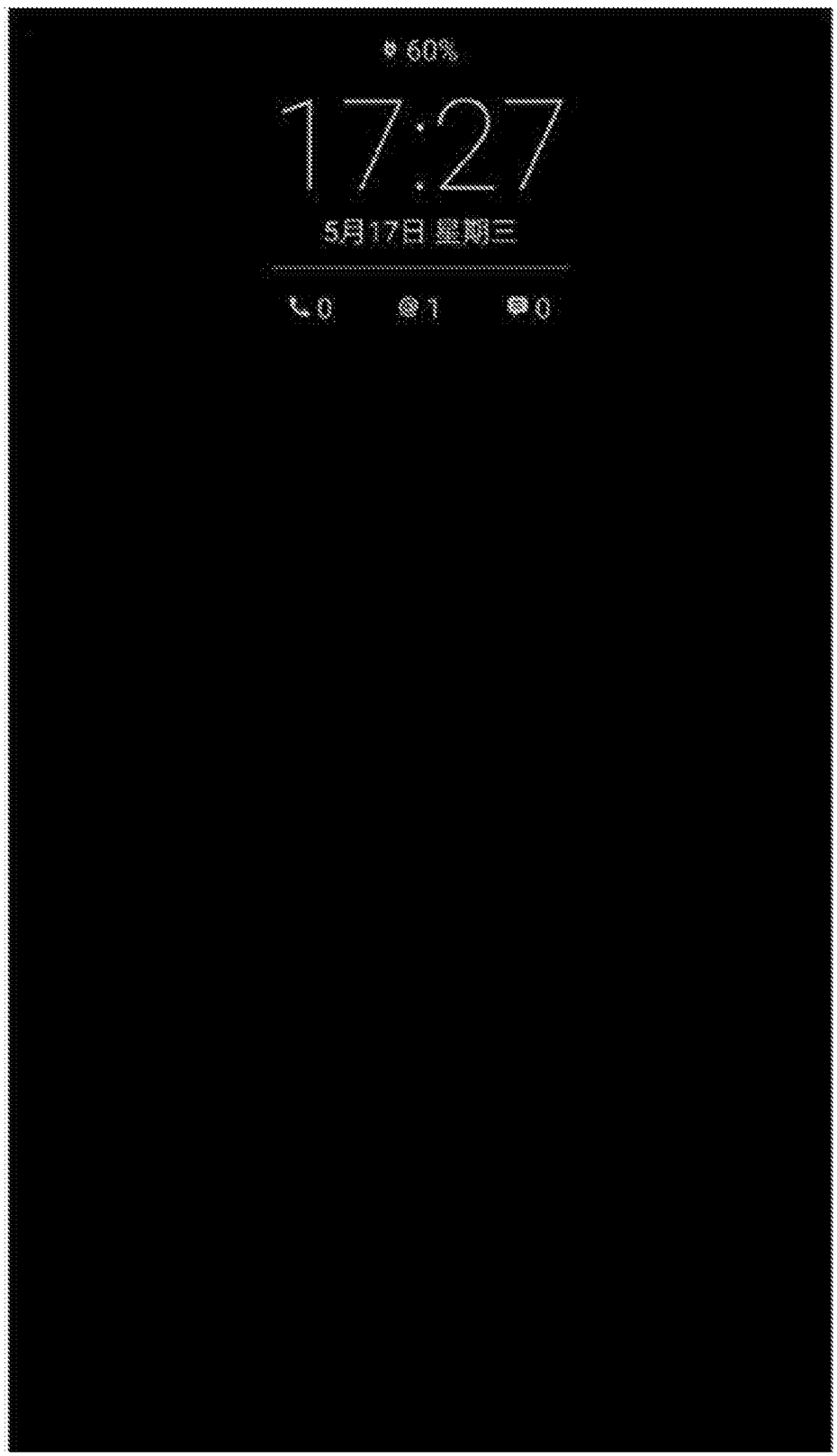
FIG. 2 is a diagram of a display of the electronic device in a partial display mode.

In at least one embodiment, as shown in FIG. 2, besides displaying the time in the partial display mode, the display 12 may also display the date, the number of missed calls, the number of unread messages, or a remaining power level in the partial interface.

The display 12 further includes a second storage 121. When the display 12 is switched to the partial display mode, the display 12 receives the partial interface from the processor 11 and stores the partial interface in the second storage 121. The display mode switching system 10 is configured to switch the display mode of the display 12 to save power of the electronic device 1.

The power unit 13 provides power to the processor 11, the display 12, the sensing unit 14, and the first storage 15. The sensing unit 14 senses a state and movement of the electronic device 1. The sensing unit 14 includes a sensor hub 141, a first sensor 142, and a second sensor 143. The first sensor 142 and the second sensor 143 are coupled through the sensor hub 141 to the processor 11. The first sensor 142 is a proximity sensor, and the second sensor 143 is a gravity sensor. The first sensor 142 and the display 12 may be arranged on a same side of the electronic device 1, and the first sensor 142 is configured to sense whether an object, such as a desk, comes near to the display 12. For example, when the electronic device 1 is placed with the display 12 facing toward the desktop of the desk, it is determined that a user is not watching the display 12. The second sensor 143 is configured to sense whether the electronic device 1 has been moved and whether the electronic device 1 has been moved in a predetermined motion. The predetermined motion causes the display 12 to be switched from the off mode to the partial display mode. For example, the electronic device 1 may be switched to the partial display mode to display the time when the electronic device 1 is picked up by the user.

The first storage 15 may be a main storage of the electronic device 1 or may be an external storage card, such as a smart media card, a secure digital card, or the like. The first storage 15 stores a plurality of data and the display mode switching system 10. The processor 11 executes an operating system and a plurality of instructions of the electronic device 1. For example, the processor 11 may execute the display mode switching system 10.

Figure 3:
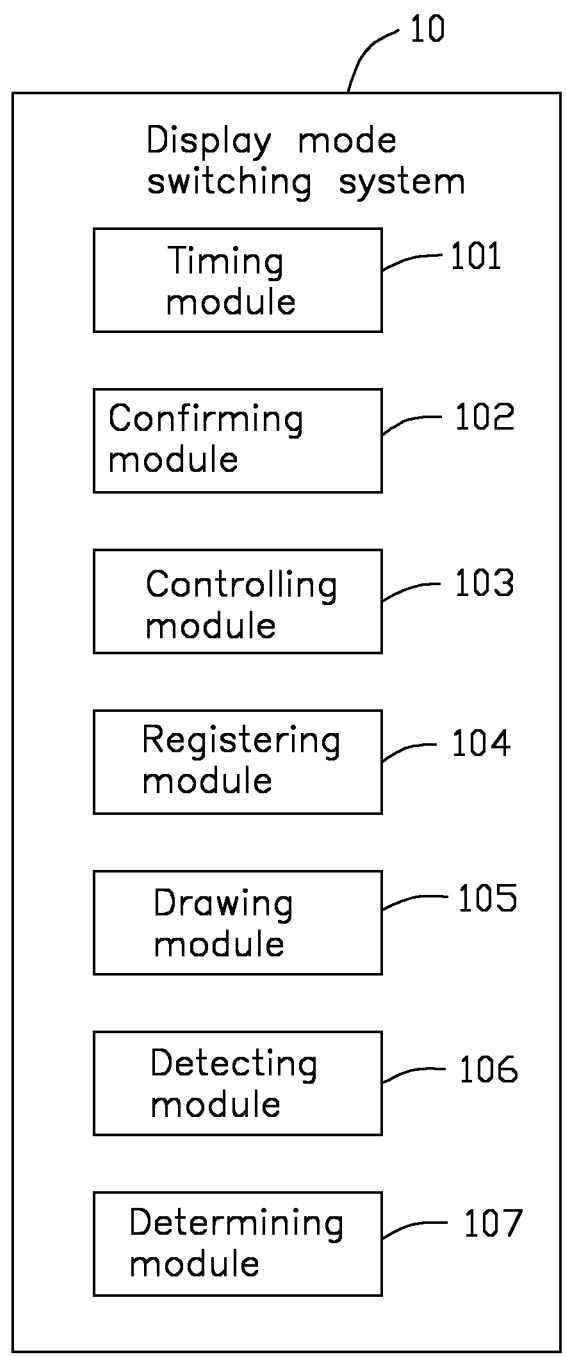
FIG. 3 is a block diagram of a display mode switching system implemented by the electronic device of FIG. 1.

Referring to FIG. 3, the display mode switching system 10 includes a timing module 101, a confirming module 102, a controlling module 103, a registering module 104, a drawing module 105, a detecting module 106, and a determining module 107.

The timing module 101 times time durations for events like switching the display 12 from the partial display mode to the off mode, waking up the processor 11 to generate an updated partial interface, or operating the electronic device 1 in the sleep mode in which the electronic device 1 is not in use. Based on the time durations, the controlling module 103 controls the processor 11 and the display 12 to switch between different modes.

The confirming module 102 confirms whether the partial display mode of the display 12 has been activated by a user. When the partial display mode has been activated, the display 12 is switched from the full display mode to the partial display mode. When the partial display mode has not been activated by a user, the display 12 is switched from the full display mode to the off mode. In at least one embodiment, the user may preset whether the partial display mode is activated through a software user interface displayed on the display 12.

The controlling module 103 controls the processor 11 and the display 12 to switch between different modes.

The registering module 104 registers a second predetermined trigger event for waking up the processor from the sleep mode to the operating mode. The second predetermined trigger event may be at least one of the following situations: a timing event, plugging a USB connector into the electronic device 1, receiving a phone call, text message, or email, or pressing a power button of the electronic device 1. The timing event is configured to activate the timing module 101 to start timing a predetermined time duration. After the timing module 101 times the predetermined time duration, the processor 11 is woken up to generate an updated partial interface.

The drawing module 105 generates the partial interface and the updated partial interface when the display 12 is in the partial display mode.

The detecting module 106 detects whether a first predetermined trigger event occurs while the display 12 is operated in the full display mode. The first predetermined trigger event includes, but is not limited to, the power button of the electronic device 1 being pressed, or the electronic device 1 not receiving a user operation for a predetermined time duration. The electronic device 1 not receiving a user operation refers to the electronic device 1 not being operated by a user, such as not being moved for a predetermined time duration, or not receiving input signals through an input device, such as a touchscreen or a key. When the first predetermined trigger event is detected, the controlling module 103 controls the display 12 to switch from the full display mode to the partial display mode and stop displaying the full color user interface. In addition, the detecting module 106 detects whether the second predetermined trigger event occurs after the processor 11 is switched to the sleep mode. When the second predetermined trigger event occurs, the controlling module 103 controls the processor 11 to switch from the sleep mode to the operating mode and controls the display 12 to switch from the partial display mode to the full display mode. In at least one embodiment, the second predetermined trigger event may be the predetermined trigger event registered by the registering module 104.

The determining module 107 determines, according to sensed data generated by the first sensor 142, whether the first sensor 142 has been covered and determines, according to sensed data generated by the second sensor 143, whether the electronic device 1 has been moved and moved in the predetermined motion.

Figure 4:
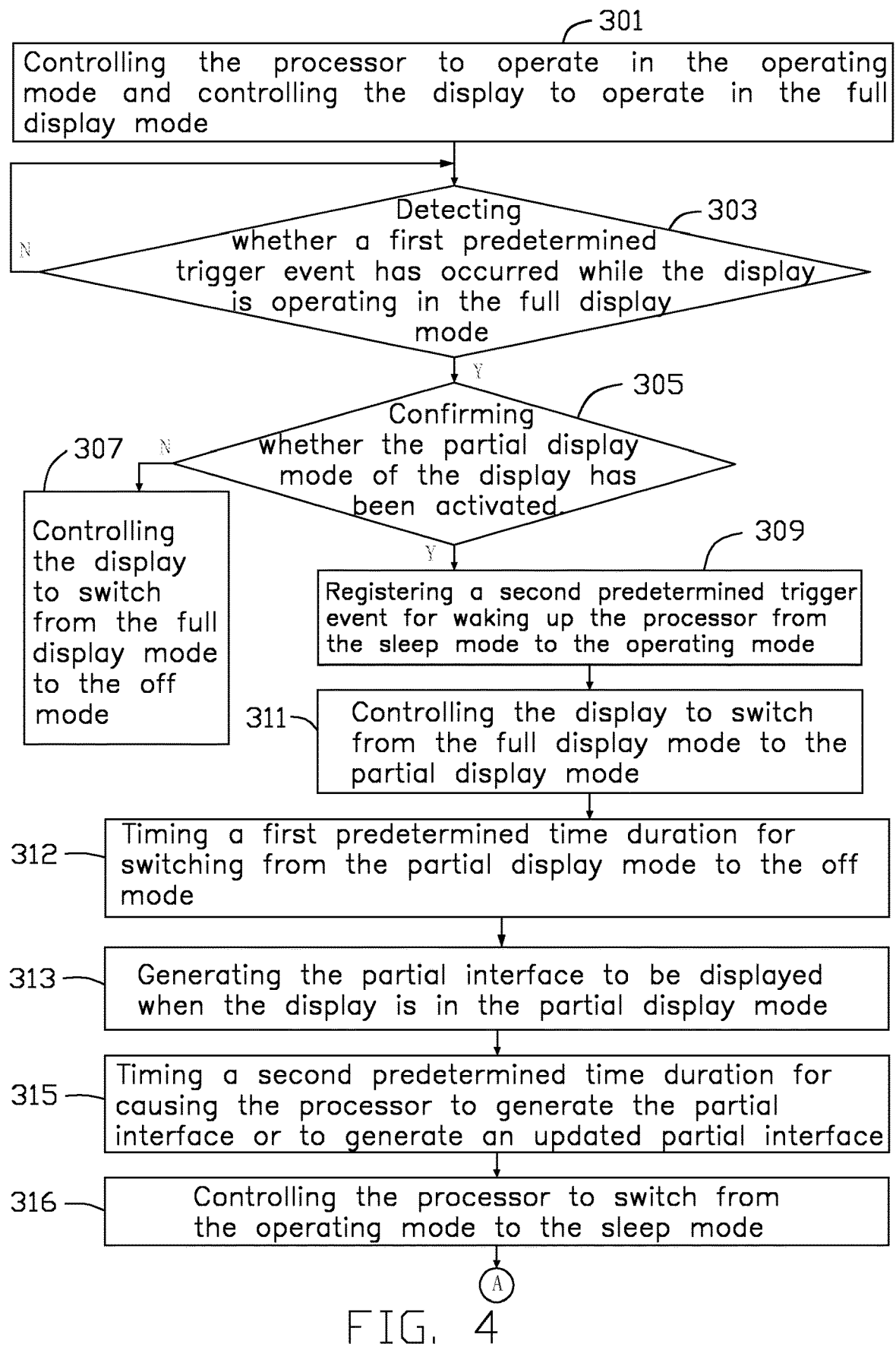
FIG. 4 is flow chart of a method for switching a display mode of the display of the electronic device.
Figure 5:
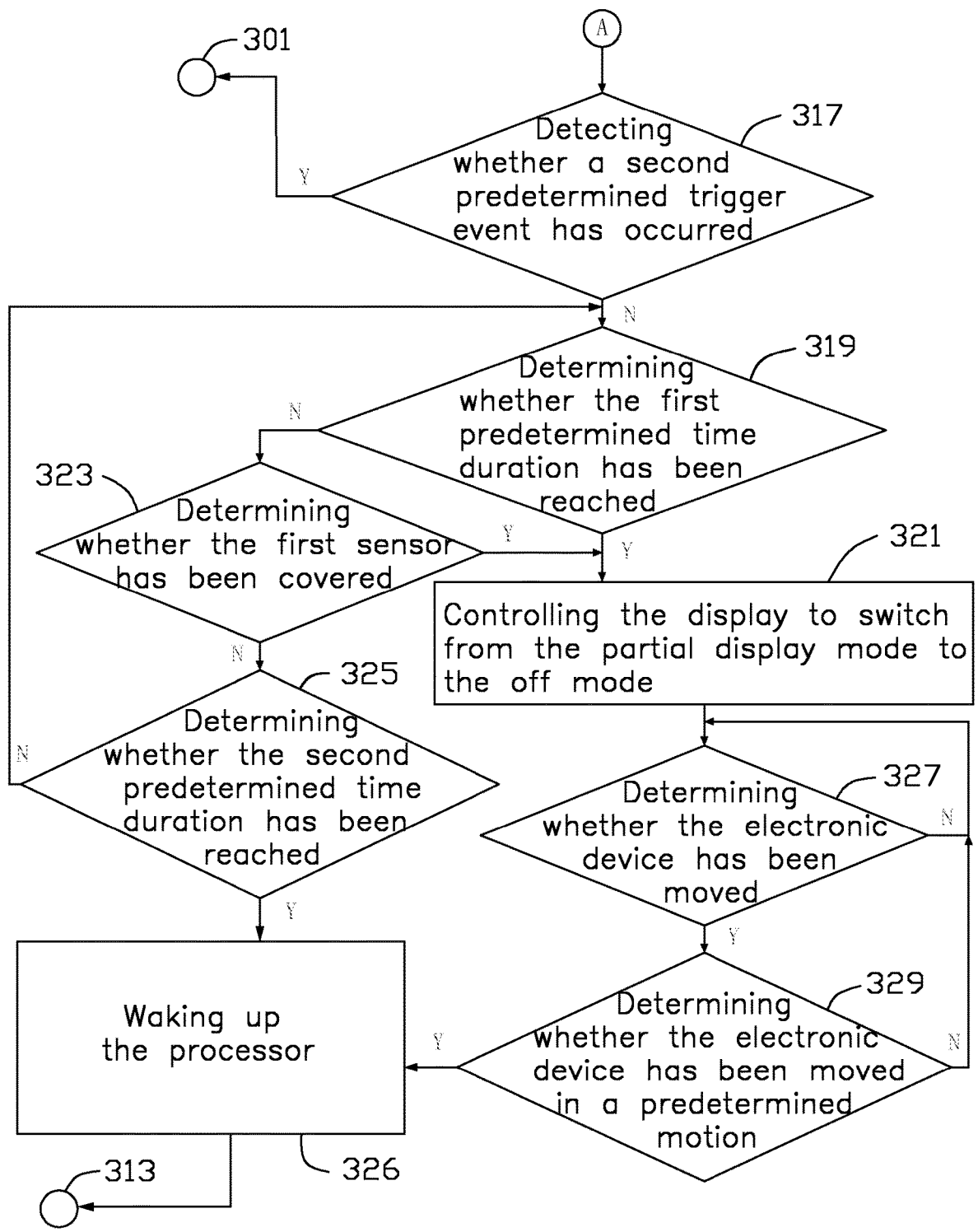
FIG. 5 is a continuation flow chart of the method in FIG. 4.

FIG. 4 illustrates a flowchart of an exemplary method for switching a display mode of an electronic device. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block 301.

At block 301, after the electronic device 1 has been powered on normally, the controlling module 103 controls the processor 11 to operate in the operating mode and controls the display 12 to operate in the full display mode to display the full color user interface.

At block 303, the detecting module 106 detects whether a first predetermined trigger event has occurred while the display 12 is operating in the full display mode. The first predetermined trigger event includes, but is not limited to, a power button of the electronic device 1 being pressed, or the electronic device 1 not receiving a user operation for a predetermined time duration. The electronic device 1 not receiving a user operation refers to the electronic device 1 not being operated by a user, such as not being moved for a predetermined time duration or not receiving input signals through an input device, such as a touchscreen or a key. When the detecting module 106 detects the first predetermined trigger event, block 305 is implemented. When the detecting module 106 does not detect the first predetermined trigger event, block 303 is repeated. In other embodiment, when the detecting module 106 detects the first predetermined trigger event, block 309 or block 311 is directly implemented.

At block 305, the confirming module 102 confirms whether the partial display mode of the display 12 has been activated. When the partial display mode has been activated, block 309 is implemented. When the partial display mode has not been activated, block 307 is implemented. In at least one embodiment, the user may preset whether the partial display mode is activated through a software user interface displayed on the display 12. In other embodiments, block 305 may be omitted, and the partial display mode may be activated by default without being confirmed by the confirming module 102.

At block 307, the controlling module 103 controls the display 12 to switch from the full display mode to the off mode.

At block 309, the registering module 104 registers a second predetermined trigger event for waking up the processor 11 from the sleep mode to the operating mode. The second predetermined trigger event may be at least one of the following situations: a timing event, plugging a USB connector into the electronic device 1, receiving a phone call, text message, or email, or pressing a power button of the electronic device 1. The timing event is configured to activate the timing module 101 to start timing a predetermined time duration. After the timing module 101 times the predetermined time duration, the processor 11 is woken up to generate an updated partial interface. In another embodiment, block 309 may be omitted, and the second predetermined trigger event may be set by default without any registering process performed by the registering module 104.

At block 311, the controlling module 103 controls the display 12 to switch from the full display mode to the partial display mode and stop displaying the full color user interface.

At block 312, after the display 12 switches to the partial display mode, the timing module 101 starts to time a first predetermined time duration. The first predetermined time duration is a predetermined time duration for controlling the display 12 to switch from the partial display mode to the off mode. In detail, when the timing module 101 reaches the first predetermined time duration, the controlling module 103 controls the display 12 to switch from the partial display mode to the off mode.

At block 313, the processor 11 generates the partial interface to be displayed when the display 12 is in the partial display mode. The processor 11 generates the partial interface at a first time. In at least one embodiment, the processor 11 uses the drawing module 105 to generate the partial interface. The drawing module 105 may be a software application executed by the processor 11, or may be hardware integrated within the processor 11.

At block 315, after the partial interface has been displayed on the display 12, the timing module 101 starts to time a second predetermined time duration. The second predetermined time duration is a predetermined time duration for causing the processor 11 to generate the partial interface or to generate an updated partial interface. In detail, when the timing module 101 reaches the second predetermined time duration, the processor 11 is caused to generate the partial interface or the updated partial interface. The first predetermined time duration is longer than the second predetermined time duration.

At block 316, the controlling module 103 controls the processor 11 to switch from the operating mode to the sleep mode.

At block 317, after the processor 11 has switched to the sleep mode, the detecting module 106 detects whether a second predetermined trigger event has occurred. When the second predetermined trigger event has occurred, block 301 is repeated, the processor 11 is switched from the sleep mode to the operating mode, and the display 12 is switched from the partial display mode to the full display mode. When the second predetermined trigger event has not occurred, block 319 is implemented.

At block 319, the timing module 101 determines whether the first predetermined time duration has been reached. When the first predetermined time duration has been reached, block 321 is implemented. When the first predetermined time duration has not been reached, block 323 is implemented. In another embodiment, when the first predetermined time period has not been reached, block 325 may be directly implemented with block 323 skipped.

At block 321, the controlling module 103 controls the display 12 to switch from the partial display mode to the off mode, and block 327 is implemented.

At block 323, the determining module 107 determines, according to sensed data generated by the first sensor 142, whether the first sensor 142 has been covered. When the first sensor 142 has not been covered, block 325 is implemented. When the first sensor 142 has been covered, block 321 is implemented. In at least one embodiment, when the display 12 is placed to face an object, such as a desk, the determining module 107 determines that the first sensor 142 has been covered according to the sensed data of the first sensor 142 so as to determine that a user is not watching the display 12.

At block 325, the timing module 101 determines whether the second predetermined time duration has been reached. When the second predetermined time duration has been reached, block 326 is implemented. When the second predetermined time duration has not been reached, block 319 is repeated.

At block 326, the processor 11 is waken up, and block 313 is implemented again. The processor 11 generates an updated partial interface and displays the updated partial interface on the display 12. The updated partial interface is generated at a second time. A time difference between the second time, at which the updated partial interface is generated in block 313, and the first time, at which the partial interface was generated previously in block 313, is equal to the second predetermined time duration. In at least one embodiment, the second predetermined time duration is 60 seconds.

At block 327, the determining module 107 determines, according to sensed data generated by the second sensor 143, whether the electronic device 1 has been moved. When the electronic device 1 has not been moved, block 327 is repeated. When the electronic device 1 has been moved, block 329 is implemented.

At block 329, the determining module 107 further determines whether the electronic device 1 has been moved in a predetermined motion. The predetermined motion causes the display 12 to switch from the off mode to the partial display mode. For example, the electronic device 1 may be switched to the partial display mode when the electronic device 1 is picked up by the user for checking the time displayed on the display 12. When the electronic device 1 has not been moved in the predetermined motion, block 327 is repeated. When the electronic device 1 has been moved in the predetermined motion, blocks 326 and 313 are implemented in sequence, and the processor 11 is caused to generate the updated partial interface and display the updated partial interface on the display 12.

The method described above first determines whether the electronic device 1 has been moved, and then determines whether the electronic device 1 has been moved in the predetermined motion. When the electronic device 1 is kept still, then it is not necessary to determine whether the electronic device 1 has been moved, thereby saving power consumption of the electronic device 1.

The method, system, and electronic device 1 for switching the display mode are able to control the display 12 to switch to the partial display mode, so that the user may obtain necessary information from the partial display mode. In addition, the partial display mode saves power, and a user may move the electronic device 1 in the predetermined motion to switch the display mode of the display 12.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for switching a display mode of an electronic device comprising a display and a processor, the display operable in a full display mode, a partial display mode, and an off mode, and the processor operable in an operating mode and a sleep mode, the method comprising:
   controlling the display to operate in the full display mode to display a full color user interface;
   detecting whether a first predetermined trigger event occurs;
   controlling the display, when the first predetermined trigger event occurs, to switch from the full display mode to the partial display mode and stop displaying the full color user interface;
   starting to time a first predetermined time duration when the display is switched to the partial display mode;
   generating, by the processor, a partial interface and displaying the partial interface on the display;
   starting to time a second predetermined time duration when the partial interface is displayed on the display and controlling the processor to switch from the operating mode to the sleep mode;
   detecting whether a second predetermined trigger event occurs after the processor is switched to the sleep mode;
   controlling the processor, when it is determined that the second predetermined trigger event occurs, to switch from the sleep mode to the operating mode, and controlling the display to switch from the partial display mode to the full display mode;
   determining, when it is determined that the second predetermined trigger event does not occur, whether the first predetermined time duration has been reached;
   controlling the display, when it is determined that the first predetermined time duration has been reached, to switch from the partial display mode to the off mode; and
   waking up the processor, when the first predetermined time duration has not been reached and the second predetermined time duration has been reached, to generate an updated partial interface and display the updated partial interface on the display.

2. The method of claim 1, wherein the partial interface is generated at a first time, the updated partial interface is generated at a second time, and a time difference between the first time and the second time is equal to the second predetermined time duration; and wherein the first predetermined time duration is longer than the second predetermined time duration.

3. The method of claim 1, wherein the electronic device comprises a proximity sensor and the method further comprises:
   determining, when the first predetermined time duration has not been reached, whether the proximity sensor is covered;
   controlling the display, when the proximity sensor is covered, to switch from the partial display mode to the off mode;
   waking up the processor, when the second predetermined time duration has been reached and when the proximity sensor is not covered, to generate the updated partial interface and display the updated partial interface on the display.

4. The method of claim 1 further comprising:
   confirming whether the partial display mode has been activated;
   controlling the display, when the partial display mode has been activated, to switch from the full display mode to the partial display mode; and
   controlling the display, when the partial display mode has not been activated, to switch from the full display mode to the off mode.

5. The method of claim 4 further comprising:
   registering, when the partial display mode has been activated, a second trigger event for waking up the processor from the sleep mode to the operating mode; wherein the second trigger event comprises the second predetermined trigger event.

6. The method of claim 1 further comprising:
   determining, when the display is switched from the partial display mode to the off mode, whether the electronic device has been moved;
   determining, when the electronic device has been moved, whether the electronic device has been moved in a predetermined motion;
   waking up the processor, when the electronic device has been moved in the predetermined motion, to generate the updated partial interface and display the updated partial interface on the display.

7. An electronic device comprising a display and a processor, the display operable in a full display mode, a partial display mode, and an off mode, and the processor operable in an operating mode and a sleep mode, the processor being configured to:
   control the display to operate in the full display mode to display a full color user interface;
   detect whether a first predetermined trigger event occurs;
   control the display, when the first predetermined trigger event occurs, to switch from the full display mode to the partial display mode and stop displaying the full color user interface;
   generate a partial interface and display the partial interface on the display;
   switch from the operating mode to the sleep mode after the partial interface is displayed on the display;
   time a first predetermined time duration when the display is switched to the partial display mode, and time a second predetermined time duration when the partial interface is displayed on the display;
   detect whether a second predetermined trigger event occurs after the processor is switched to the sleep mode;
   switch from the sleep mode to the operating mode, when it is determined that the second predetermined trigger event occurs, and control the display to switch from the partial display mode to the full display mode;
   determine, when it is determined that the second predetermined trigger event does not occur, whether the first predetermined time duration has been reached;

control the display, when it is determined that the first predetermined time duration has been reached, to switch from the partial display mode to the off mode; and generate an updated partial interface and display the updated partial interface on the display when the first predetermined time duration has not been reached and the second predetermined time duration has been reached.

8. The electronic device of claim 7, wherein the partial interface is generated at a first time, the updated partial interface is generated at a second time, and a time difference between the first time and the second time is equal to the second predetermined time duration; and wherein the first predetermined time duration is longer than the second predetermined time duration.

9. The electronic device of claim 7, wherein the electronic device comprises a proximity sensor and the processor is further configured to:

determine, when the first predetermined time duration has not been reached, whether the proximity sensor is covered;

control the display, when the proximity sensor is covered, to switch from the partial display mode to the off mode;

generate the updated partial interface and display the updated partial interface on the display when the second predetermined time duration has been reached and when the proximity sensor is not covered.

10. The electronic device of claim 7, wherein the processor is further configured to:

confirm whether the partial display mode has been activated;

control the display, when the partial display mode has been activated, to switch from the full display mode to the partial display mode; and control the display, when the partial display mode has not been activated, to switch from the full display mode to the off mode.

11. The electronic device of claim 10, wherein the processor is further configured to register, when the partial display mode has been activated, a second trigger event for waking up the processor from the sleep mode to the operating mode; wherein the second trigger event comprises the second predetermined trigger event.

12. The electronic device of claim 9, wherein the processor is further configured to:

determine, when the display is switched from the partial display mode to the off mode, whether the electronic device has been moved;

determine, when the electronic device has been moved, whether the electronic device has been moved in a predetermined motion; and be waken up, when the electronic device has been moved in the predetermined motion, to generate the updated partial interface and display the updated partial interface on the display.

13. The electronic device of claim 7, wherein the display in the partial display mode consumes less power than the display in the full screen mode.

14. The electronic device of claim 7, wherein the first predetermined trigger event comprises:

pressing a power button of the electronic device; or the condition that the electronic device is not operated for a predetermined time duration.

15. A non-transitory storage medium having stored thereon instructions that, when executed by at least one processor of an electronic device, causes the least one processor to execute instructions of a method for switching a display mode of an electronic device, the method comprising:

controlling the display to operate in the full display mode to display a full color user interface;

detecting whether a first predetermined trigger event occurs;

controlling the display, when the first predetermined trigger event occurs, to switch from the full display mode to the partial display mode and stop displaying the full color user interface;

starting to time a first predetermined time duration when the display is switched to the partial display mode;

generating a partial interface and displaying the partial interface on the display;

starting to time a second predetermined time duration when the partial interface is displayed on the display and controlling the processor to switch from the operating mode to the sleep mode;

detecting whether a second predetermined trigger event occurs after the processor is switched to the sleep mode;

controlling the processor, when it is determined that the second predetermined trigger event occurs, to switch from the sleep mode to the operating mode, and controlling the display to switch from the partial display mode to the full display mode;

determining, when it is determined that the second predetermined trigger event does not occur, whether the first predetermined time duration has been reached;

controlling the display, when it is determined that the first predetermined time duration has been reached, to switch from the partial display mode to the off mode;

waking up the processor, when the first predetermined time duration has not been reached and the second predetermined time duration has been reached, to generate an updated partial interface and display the updated partial interface on the display.

16. The non-transitory storage medium of claim 15, wherein the partial interface is generated at a first time, the updated partial interface is generated at a second time, and a time difference between the first time and the second time is equal to the second predetermined time duration; and wherein the first predetermined time duration is longer than the second predetermined time duration.

17. The non-transitory storage medium of claim 15, wherein the electronic device comprises a proximity sensor and the method further comprises:

determining, when the first predetermined time duration has not been reached, whether the proximity sensor is covered;

controlling the display, when the proximity sensor is covered, to switch from the partial display mode to the off mode;

waking up the processor, when the second predetermined time duration has been reached and when the proximity sensor is not covered, to generate the updated partial interface and display the updated partial interface on the display.

18. The non-transitory storage medium of claim 15, the method further comprising:

confirming whether the partial display mode has been activated;

controlling the display, when the partial display mode has been activated, to switch from the full display mode to the partial display mode; and controlling the display, when the partial display mode has not been activated, to switch from the full display mode to the off mode.

19. The non-transitory storage medium of claim 18, the method further comprising:
registering, when the partial display mode has been activated, a second trigger event for waking up the processor from the sleep mode to the operating mode; wherein the second trigger event comprises the second predetermined trigger event.

20. The non-transitory storage medium of claim 15, the method further comprising:
determining, when the display is switched from the partial display mode to the off mode, whether the electronic device has been moved;
determining, when the electronic device has been moved, whether the electronic device has been moved in a predetermined motion;
waking up the processor, when the electronic device has been moved in the predetermined motion, to generate the updated partial interface and display the updated partial interface on the display.

* * * * *